United States Patent [19]

Kawamoto et al.

[11] Patent Number: 4,695,068
[45] Date of Patent: Sep. 22, 1987

[54] FRONT AND REAR WHEEL STEERING DEVICE

[75] Inventors: Yoshimichi Kawamoto; Yoshimi Furukawa; Tetsuro Hamada; Mitsuya Serizawa, all of Tochigi, Japan

[73] Assignee: Honda Giken Kogyo Kabushiki Kaisha, Tokyo, Japan

[21] Appl. No.: 822,000

[22] Filed: Jan. 24, 1986

[30] Foreign Application Priority Data

| Jan. 24, 1985 | [JP] | Japan | 60-011821 |
| Jan. 24, 1985 | [JP] | Japan | 60-011822 |
| Jan. 24, 1985 | [JP] | Japan | 60-011823 |
| Jan. 24, 1985 | [JP] | Japan | 60-011824 |
| Jan. 24, 1985 | [JP] | Japan | 60-011825 |
| Jan. 24, 1985 | [JP] | Japan | 60-011826 |

[51] Int. Cl.$^4$ .............................................. B62D 6/00
[52] U.S. Cl. ........................................................ 280/91
[58] Field of Search .............................. 280/91, 96, 99; 180/170, 172, 140, 141, 142, 143, 336; 74/571 L'831; 364/424

[56] References Cited

U.S. PATENT DOCUMENTS

| 3,800,904 | 4/1974 | Zelenka | 180/170 |
| 3,903,983 | 9/1975 | Yeske | 280/91 |
| 4,313,514 | 2/1982 | Furukawa et al. | 280/91 |
| 4,386,674 | 6/1983 | Sugata | 180/142 |
| 4,572,316 | 2/1986 | Kanazawa et al. | 280/91 |

FOREIGN PATENT DOCUMENTS 2174222  5/1985  United Kingdom ................ 280/91

Primary Examiner—John J. Love
Assistant Examiner—Karin L. Ferriter
Attorney, Agent, or Firm—Lyon & Lyon

[57] ABSTRACT

In a front and rear wheel steering device contive for vehicle in which the steering angle ratio of the rear wheels relative to the front wheels is variable according to the vehicle speed, provision of a manual selection means for fixing the steering angle ratio to certain fixed values which may be either positive or negative can greatly improve the maneuverability of the vehicle in both high speed and low speed ranges. However, inadvertent manual selection of the steering angle ratio is not desirable since it may cause a sudden change in the steering angle of the rear wheels. Therefore, this invention provides means for preventing the manual selection of the steering angle ratio when it is not proper. This means may be an active prohibition control of manual steering angle ratio selection means, an alarm to warn the driver or a vehicle speed control which limits the vehicle speed. The situations in which the manual selection of the steering angle ratio is not proper may be determined from such factors as vehicle acceleration, transmission shift position, steering rate and so on.

13 Claims, 17 Drawing Figures

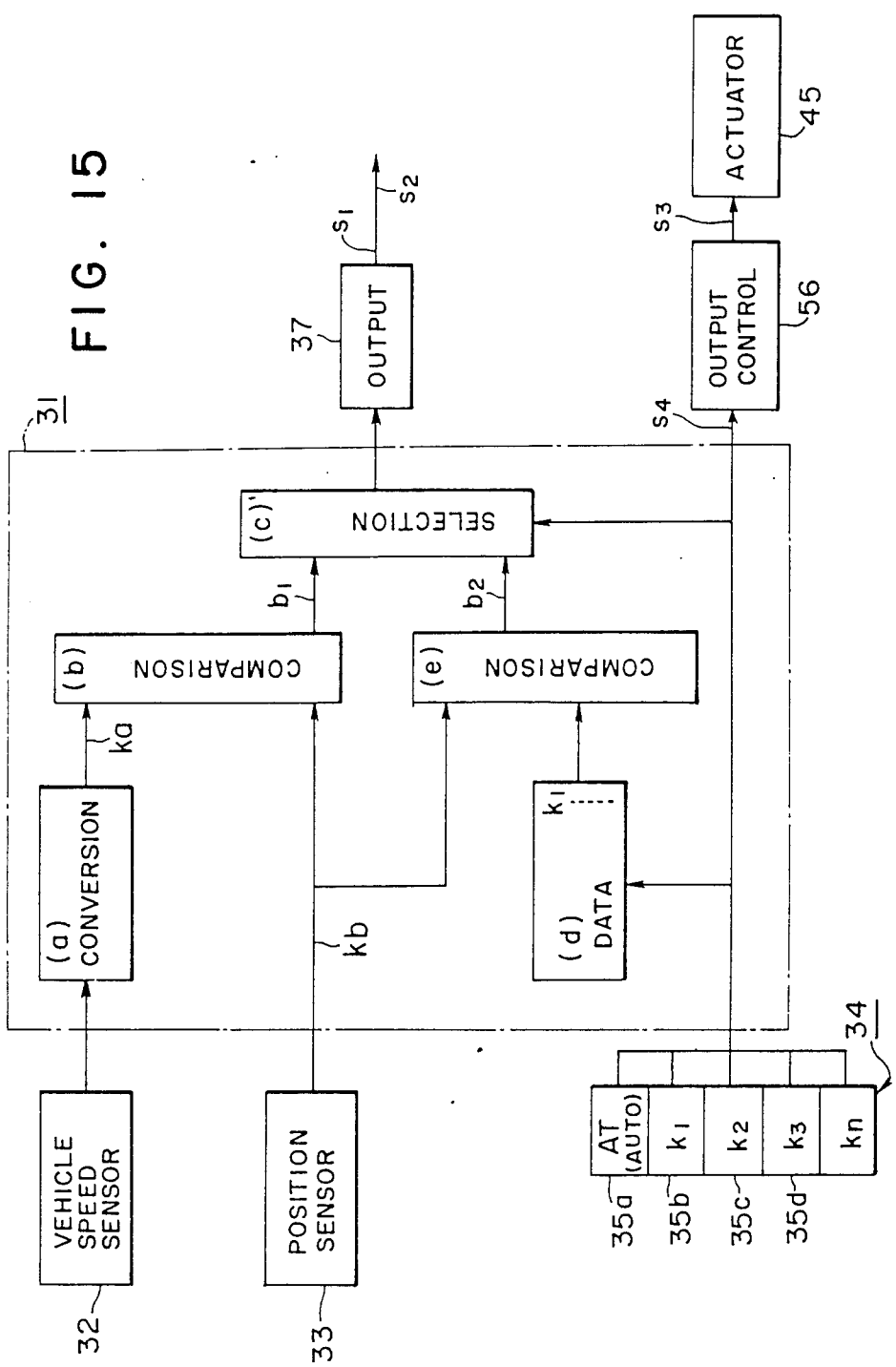

FRONT AND REAR WHEEL STEERING DEVICE

FIELD OF THE INVENTION

This invention relates to an improvement of a front and rear wheel steering device control for vehicle which can variably control the steering angle of the rear wheels in relation with the steering angle of the front wheels.

DESCRIPTION OF THE PRIOR ART

There have been a number of proposals to provide front and rear wheel steering devices particularly in the form of four wheel steering devices. For instance, Japanese Patent Application No. 57-190052 (Japanese Patent Laying-Open Publication No. 59-81264) proposes a front and rear wheel steering device control for a vehicle which not only steers the rear wheels in relation with the steering of the front wheels but also varies the steering angle ratio of the rear wheels relative to the steering angle of the front wheel according to vehicle speed. The outline of this device is as follows: The rear wheels are steered in the same phase relationship relative to the front wheels or none at all in low speed range and are steered in the opposite phase relationship in high speed range. The steering angle ratio is a continuous function relative to the vehicle speed, for instance, as indicated by the line "D" in FIG. 6, with the steering angle ratio assuming a positive value or a same phase relationship when the vehicle speed is greater than a certain vehicle speed d and assuming a negative value or a same phase relationship when the vehicle speed is lower than it.

Thus, a continuous control of the steering angle ratio is performed according to this continuous function D so that the function line of the steering device may be favorable in both high speed and low speed ranges. Specifically, the minimum angle of turning and the inner radius difference of the vehicle are both drastically reduced and the maneuverability of the vehicle, particularly in low speed range, in driving the vehicle into a garage, driving the car through narrow and crooked alleys and making a U-turn are substantially improved with the additional advantage of improving the dynamic lateral response of the vehicle in high speed range.

However, in low speed range, since, for instance, when parking a vehicle along a curbstone or when laterally displacing a vehicle in a limited space, if the front and rear wheels are steered in the opposite phase relationship, the rear portion of the vehicle inconveniently tends to move sideways as seen from the driver and, thus, there are situations when the steering maneuver is easier if the front and the rear wheels are steered in the same phase relationship. Even in high speed range, it may be desirable to fix the steering angle ratio according to the desire of the driver. Such desire may be satisfied by providing a manual switching means to such a front and rear wheel steering device so that the rear wheel steering angle ratio may be fixed according to the desire of the driver.

However, the activation of such a manual switching means may cause a sudden change in the steering angle of the rear wheels depending on the operating conditions of the vehicle and it may be a burden to the driver that he has to adapt himself to the fixed steering angle ratio without prior knowledge thereof, particularly in high speed range. The above-indicated Japanese patent publication discloses the provision of a manual fixed condition and only a partial solution to the above-cited problems.

For instance, if the manual switching means is switched over for a mode in which the rear wheels are steered in the same phase relationship as the front wheels when the driver is accelerating the vehicle and the rear wheels are still steered in the opposite phase relationship relative to the front wheels, the turning trajectory of the vehicle may rapidly bulge out to the outside and the driver may be required to make a prompt corrective action.

For instance, if the animal switching means is switched on when the driver is making a sudden steering action to turn the vehicle sharply, there may arise a sudden change in the dynamic state of the vehicle due to the temporary change in the steering property and the driver may be required to make a prompt corrective action. This may well be a problem even in a relatively low speed range.

SUMMARY OF THE INVENTION

In view of such problems, a primary object of this invention is to provide a front and rear wheel steering device for vehicle which, by being equipped with a manual switching means, can drastically improve the maneuverability of the vehicle and, additionally, will not cause any sudden change in the motion of the vehicle when the manual selection of steering angle ratio is attempted in an improper situation.

Another object of this invention is to provide a front and rear wheel steering device for vehicle equipped with a manual steering angle ratio selection means which allows the manual selection of steering angle ratio only when the manual selection will not cause a sudden change in the motion of the vehicle.

Yet another object of this invention is to provide a front and rear wheel steering device equipped with a manual steering angle ratio selection means which automatically and actively releases the manual selection condition when the manual selection condition is not proper.

Yet another object of this invention is to provide a front and rear wheel steering device equipped with a manual steering angle ratio selection means which issues a warning when a manual selection condition is selected and such a selection is improper.

Yet another object of this invention is to provide a front and rear wheel steering device equipped with a manual steering angle ratio selection means which limits the vehicle speed to prevent any undesirable response of the vehicle when a manual selection condition is selected and such a selection is improper.

In order to achieve such objects, the present invention provides a front and rear wheel steering device for vehicle for variably controlling the steering angle ratio of rear wheels relative to front wheels according to certain conditions, comprising: storage means for storing data of at least one fixed rear wheel steering ratio and a variable rear wheel steering angle ratio which is a function of vehicle speed; actuator means for achieving a rear wheel steering angle ratio selected from the data stored in the storage means; manual switching means which selects the fixed rear wheel steering angle when activated and selects the variable rear wheel steering angle ratio when deactivated; and a limiting means for deactivating the action of the manual switching means when a certain vehicle condition is produced. The condition which will not permit the manual selection of a steering angle ratio may be the acceleration and deceleration of the vehicle, the steering action by the driver, high vehicle speed or others which may cause a situation in which such a manual selection of a steering angle ratio may not be proper.

Thus, by prohibiting the action of the manual switching means when the condition of the vehicle does not permit it, the inconveniences which may arise from sudden changes in the steering angle of the rear wheels are avoided.

According to a certain aspect of the present invention, alarm means is provided instead of the limiting means. Furthermore, the alarm means may be activated either when the steering angle ratio is manually selected or when any improper condition arises after the steering angle ratio is manually selected.

By warning the driver when he has manually selected a steering angle ratio and such a selection is improper, he can either release the manual selection or reduce the vehicle speed.

According to a certain aspect of the present invention, delay means is provided to the limiting means so thta the manual selection may not cause sudden change in the steering angle of the rear wheels by changing the steering angle ratio gradually.

According to yet another aspect of the present invention, there is provided a vehicle speed limiting means instead of the manual selection limiting means so that any improper situation may be avoided by limiting the vehicle speed within permissible range.

BRIEF DESCRIPTION OF THE DRAWINGS

Such and other objects and advantages of the present invention will be better understood with reference to the following description and the appended drawings in which:

FIG. 15 is a functional block diagram of the embodiment of FIGS. 13 and 14.

DETAILED DESCRIPTION OF THE PREFERRED EMBODIMENTS

Now embodiments of this invention are described in the following with reference to the appended drawings.

Figure 1:
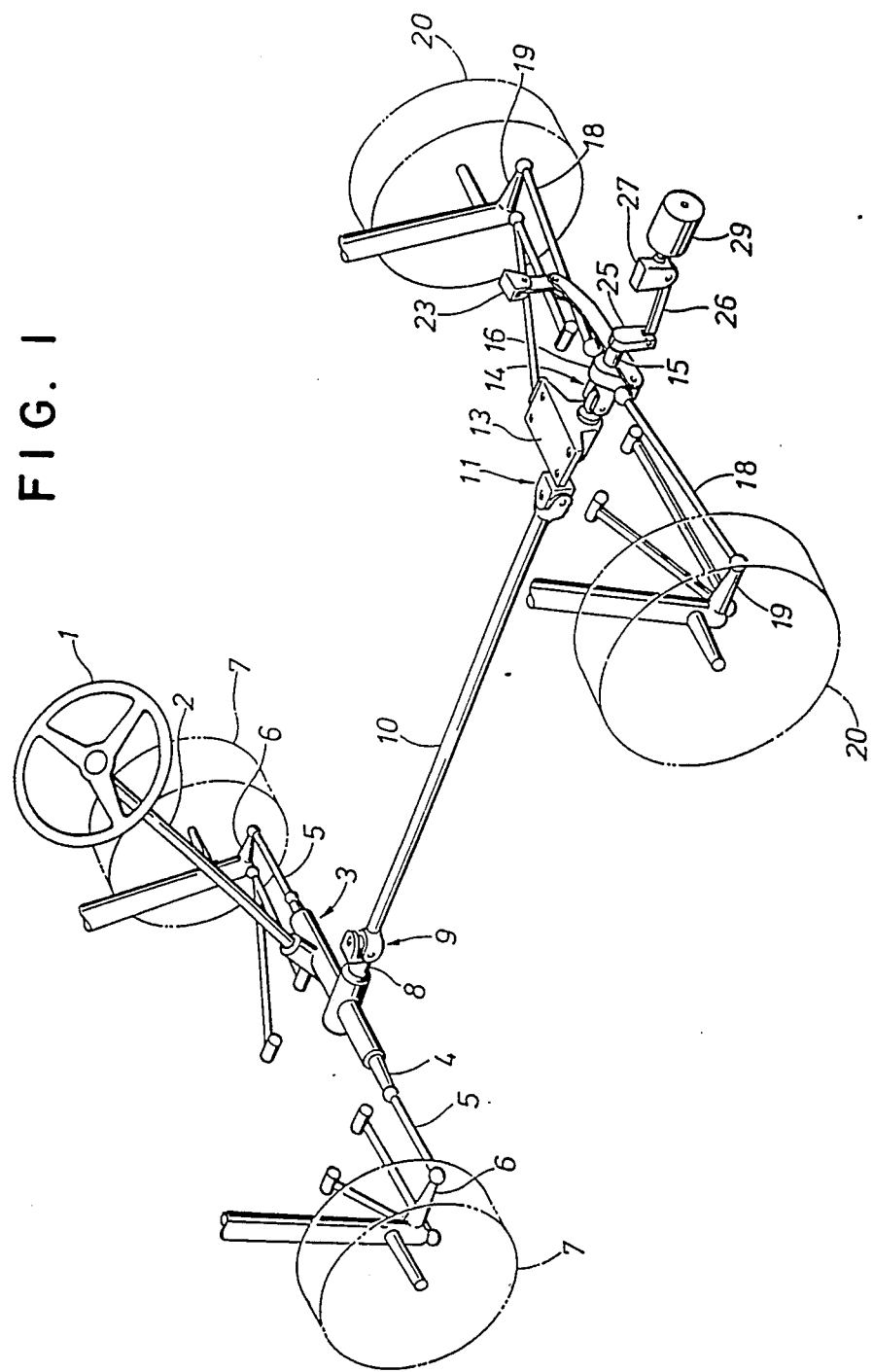
FIG. 1 is a perspective view showing the general basic structure of a vehicle provided with a front and rear wheel steering device with the chassis of the vehicle removed.
Figure 2:
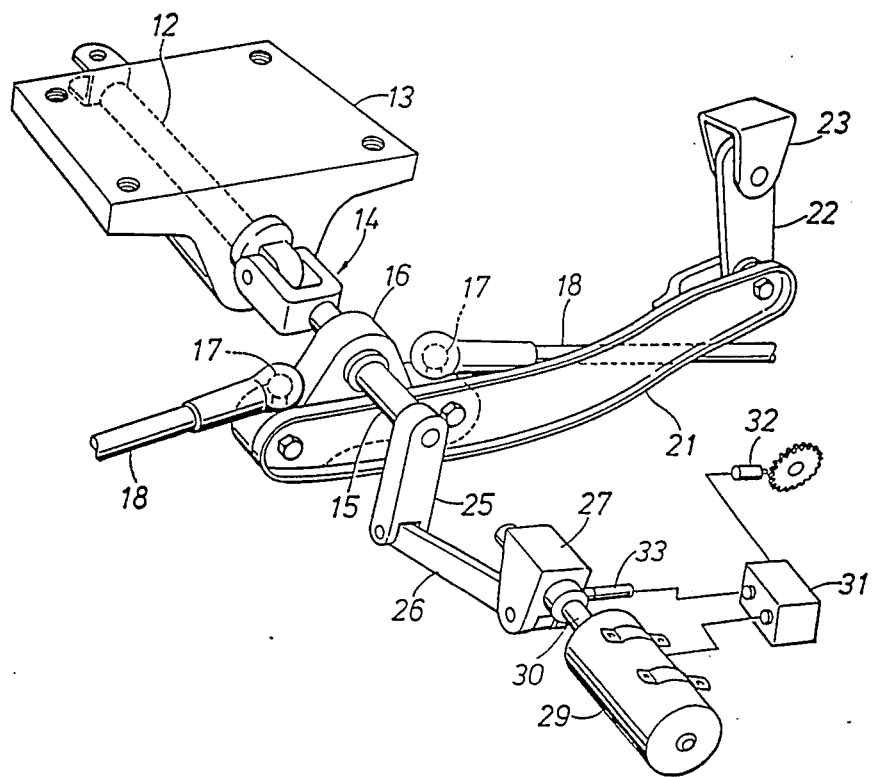
FIG. 2 is a magnified perspective view of a rear wheel steering system of the embodiment of FIG. 1.

In the drawings, FIG. 1 is a perspective view showing the outline of the basic structure of a vehicle equipped with a front and rear wheel steering device according to this invention; FIG. 2 is a magnified perspective view of a front wheel steering system of the embodiment of FIG. 1; and FIGS. 3 (a), (b) and (c) are partially broken away side views illustrating the action thereof.

As shown in FIG. 1, a steering column shaft 2 of a steering wheel 1 is joined into a rack and pinion type gear box 3, and a pair of tie rods 5 are connected to the two ends of a rack shaft 4 which meshes with a pinion gear (not shown in the drawings) integrally attached to the lower end of the steering column shaft 2. To the external ends of the tie rods 5 are connected a pair of knuckle arms 6 which support right and left front wheels 7, respectively, in such a manner that the front wheels 7 can be steered to the direction determined by the steering wheel 1 in the known manner.

A pinion shaft 8 extends from the gear box 3 to the rearward direction and an elongated linkage shaft 10 is connected to the rear end of the pinion shaft 8 by way of a universal joint 9. The pinion shaft 8 is provided with a pinion gear (which is not shown in the drawings) which meshes with the rack shaft 4. And an input shaft 12 (FIG. 2) is connected to the rear end of the linkage shaft 10 by way of another universal joint 11. This input shaft 12 is disposed along the laterally central line of the rear part of the vehicle and is rotatably supported by a bearing bracket 13 as best shown in FIG. 2.

Further, a swing shaft 15, which is shown in greater detail in FIG. 2, is connected to the rear end of the input shaft 12 by way of a clevis 14, and a joint member 16 is loosely fitted over a middle portion of the swing shaft 15. The two lateral ends of the joint member 16 are connected to tie rods 18 by way of ball joints 17, respectively, and the joint member 16 is supported by the vehicle body by way of links 21, 22 and a bracket 23 so as to be able to swing along a vertical plane which is perpendicular to the longitudinal direction of the vehicle. The external ends of the tie rods 18 are connected to a pair of knuckle arms 19 which support right and left rear wheels 20, respectively.

An arm 25 is fixedly secured to the rear end of the swing shaft 15 in a downwardly depending manner and a link 26 is pivoted to the lower end of the arm 25 while the rear end of the link 26 is in turn pivoted to a slider 27 so that the link 26 may rotate in a vertical plane which is parallel to the longitudinal direction of the vehicle. This slider 27 is threadingly engaged to an output shaft 30 of a motor 29 by way of a ball screw mechanism 28 as shown in FIG. 3, and the motor 29 is fixedly secured to the vehicle body in such a manner that this output shaft 30 is located to the rear part of the input shaft 12 in a coaxial manner relative to the input shaft 12.

A computer 31 is mounted in the vehicle and this computer 31 supplies appropriate signals to the motor 29 according to the vehicle speed by receiving signals from a vehicle speed sensor 32 and a position sensor 33 which detects the position of the slider 27.

Figure 3A:
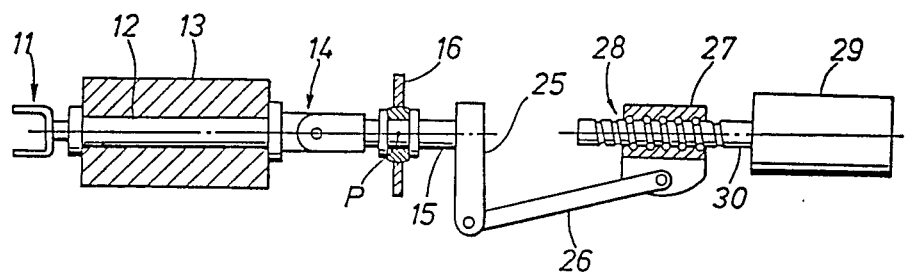
FIGS. 3 (a), (b) and (c) are broken away side views of the rear wheel steering system of FIG. 2, illustrating the working principle thereof.
Figure 3B:
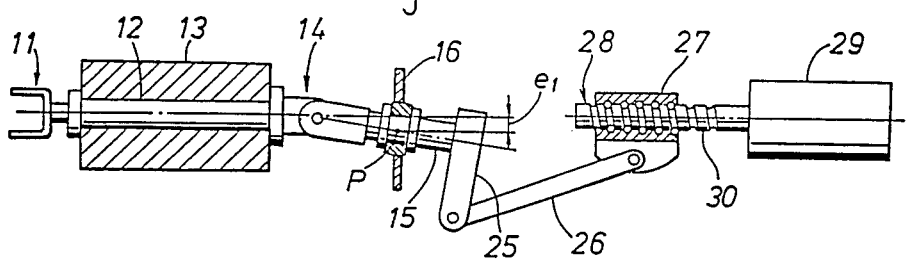
Figure 3C:
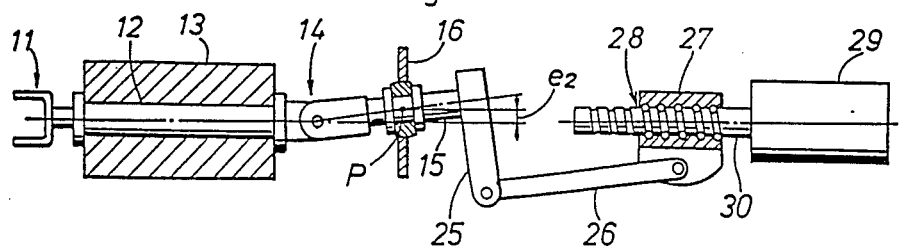

When the slider 27 is in a position shown in FIG. 3 (a) and a pivot point P of the joint member 16 coincides with the axial center of the input shaft 12, since the input shaft 12 and the swing shaft 15 rotate in a coaxial manner, the joint member 16 will not swing along the lateral direction and the tie rods 18 remain stationary even if the steering wheel 1 is rotated to cause the input shaft 12 to be rotated. Therefore, the front wheels 7 are steered while the rear wheels 20 are not steered at all.

On the other hand, when the vehicle speed is low below a certain value d (FIG. 6), with the computer driving the motor 29 according to the vehicle speed signal from the vehicle speed sensor 32, the position of the slider 27 is driven to a forwardly position as shown in FIG. 3 (b). When the slider 27 is in its forward position, since the swing shaft 15 inclines downwardly and the pivot point P is offset downwardly from the axial center of the input shaft 12 by a distance $e_1$, the joint member 16 swings along the lateral direction as the input shaft 12 is rotated as a result of the rotation of the steering wheel 1, and the tie rods 18 for the rear wheels 20 are displaced in the opposite direction relative to the displacement of the tie rods 5 for the front wheels 7. Therefore, the rear wheels 20 are steered in the opposite phase relationship relative to the front wheels 7 and the steering angle ratio between the front wheels and the rear wheels assumes a negative value and changes continuously in relation with the changes in the vehicle speed.

When the vehicle speed is high in excess of the certain value d (FIG. 6), the computer 31 drives the motor 29 reversely according to the current vehicle speed and moves the slider 27 rearwardly as shown in FIG. 3 (c). By the rearward motion of the slider 27, since the swing shaft 15 now inclines upwardly and the pivot point P moves above the axial center of the input shaft 12 by a distance $e_2$, the joint member 16 swings laterally according to the rotation of the input shaft 12 and displaces the tie rods 18 for the rear wheels 20 in the same direction as the tie rods 5 for the front wheels 7. Therefore, the rear wheels 20 are steered in the same phase relationship relative to the front wheels 7 and the steering angle ratio between the front wheels and the rear wheels assumes a positive value and changes in a continuous manner in relation with the changes in the vehicle speed.

Figure 4:
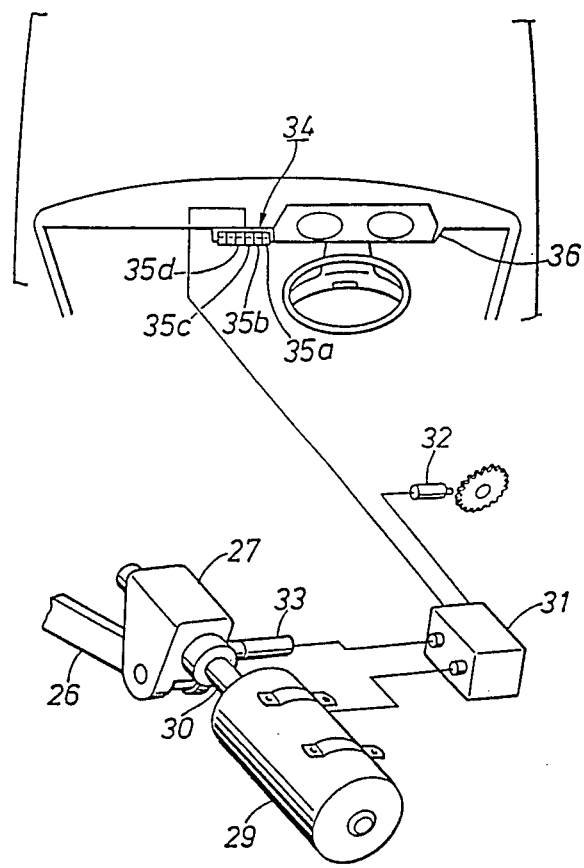
FIG. 4 is a schematic perspective view of the control structure of the embodiment of FIGS. 1 to 3.
Figure 5:
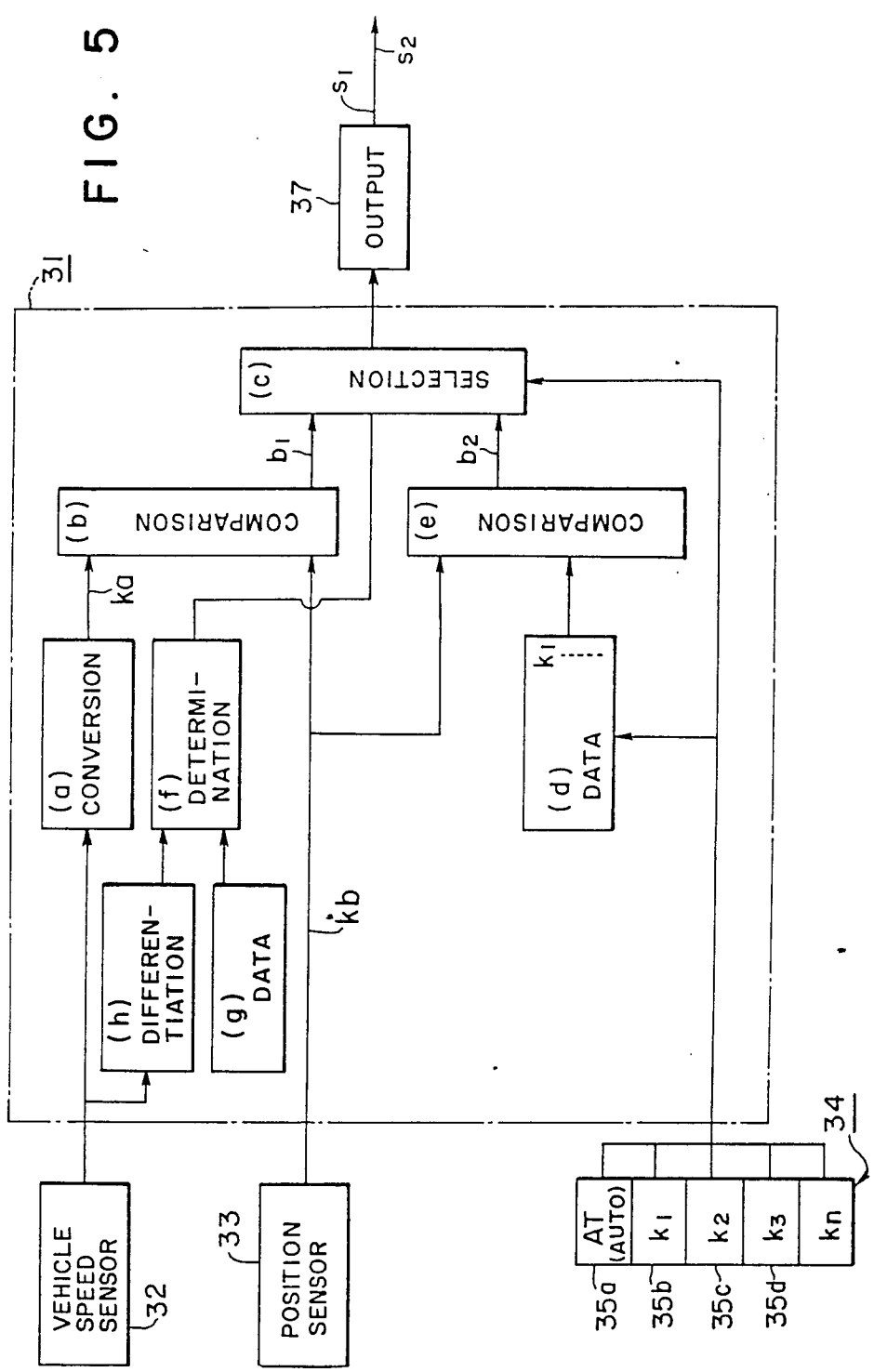
FIG. 5 is a functional block diagram of the embodiment of FIG. 4.
Figure 6:
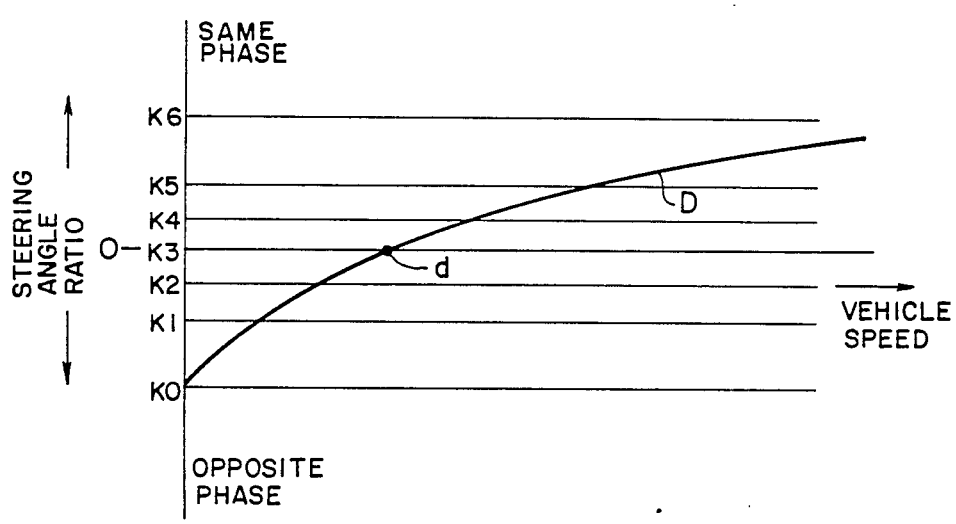
FIG. 6 is a characteristic graph of the steering angle ratio output of the embodiment of FIG. 5.

Now, the control action of the above-described embodiment, in particular the action of the computer 31, is described in the following with reference to FIGS. 4 to 6. FIG. 4 is a schematic view of a control structure of the above-described embodiment; FIG. 5 is a functional block diagram of the embodiment of FIG. 4, and FIG. 6 is a characteristic graph of the steering angle ratio output from the embodiment of FIG. 5.

First of all, in FIG. 4, numeral 34 denotes a manual steering ratio selector which includes for instance a plurality of push-buttons 35a, 35b, . . . which are arranged in an instrument panel 36 of a passenger compartment of the vehicle so that the driver may manually operate them. This selector 34 is connected to the computer 31 and the selection made on the selector 34 is transmitted to the computer 31.

Now, the action of the manual selection of steering angle ratio in the computer 31 is described in the following with reference to FIG. 5.

First is described the normal action (or automatic action: AT) in which the steering angle ratio changes automatically with the vehicle speed. This is accomplished by pushing the first push-button 35a in the selector 34. As described previously, the vehicle speed signal detected by the vehicle speed sensor 32 is inputted to the computer 31 and is converted into a steering angle ratio data $k_a$, in a conversion process (a), in association with the vehicle speed. Meanwhile, actual steering angle ratio data $k_b$ is obtained from the position sensor 33, and necessary steering angle ratio correction information $b_1$ is obtained by arithmetically processing the two steering angle ratio data $k_a$ and $k_b$ in a comparison process (b). Since the automatic action AT is selected on the selector 34, the correction information $b_1$ is produced from the computer 31 by a selection process (c) without any inhibition and a correction control signal $S_1$ for performing the necessary change of the steering angle ratio according to the vehicle speed is supplied to the motor 29 by way of an output device 37.

One or more than one set of certain steering ratio information is stored in a storage device (d) of the computer 31. This information (d) may consist of, for instance, a plurality of steering angle ratio data $k_0, k_1, \ldots, k_6$ having arbitrary values. When any one of the push-buttons in the selector 34 except for the push-button 35a for automatic action, for instance the push-button 35b, is pressed, the corresponding steering angle ratio data $k_1$ is read out from the steering angle ratio information (d) and, by conducting a comparison arithmetic process (e) in relation with the steering angle ratio data $k_b$ from the position sensor 33, correction information $b_2$ is obtained.

In the selection process (c), if any one of the push-buttons other than the push-button for the automatic action AT in the selector 34 is pressed, the output of the correction information $b_1$ is terminated and the correction information $b_2$ is produced instead. Thereby, a correction control signal $S_2$ is supplied from the output device 37 to the motor 29 to set the steering angle ratio of the rear wheels to $k_1$.

The actions by the other push-buttons 35b, 35d, . . . are similar to what was described above, and the driver can manually select any one of the steering angle ratios $k_0$ to $k_6$ which are fixed relative to the vehicle speed and shown in FIG. 6, on the manual selector 34. Thus, the driver can select the steering angle ratio of the rear wheels relative to the front wheels according to his desire and can obtain a driving response which suits his desire.

Meanwhile, the computer 31 differentiates (h) the vehicle speed signal from the vehicle speed sensor 32 and obtains a vehicle speed change rate signal for use in a determination process (f). In the determination process (f), the vehicle speed change rate signal is compared with a predetermined reference vehicle speed change rate data (g) and it is determined whether the former is greater than the latter or not. When the actual vehicle speed change rate is greater than the predetermined speed change rate, the determination result is given to the selection process (c) and the output of the correction information $b_2$ for manual correction is restricted. In other words, in the state of correcting the steering angle ratio by the automatic action AT, as long as the actual speed change rate or the vehicle acceleration is greater than the predetermined value, the selection process (c) maintains the automatic action AT and will not allow the manual action even when the manual correction is selected on the manual selector 34.

In this conjunction, the push-buttons 35a, 35b, . . . may be so arranged that they would not depress when pressed or will pop up if they have already been depressed, as the case may be, as long as the manual selection is inhibited.

Thus according to this embodiment, the maneuverability of a vehicle can be improved by allowing the manual change of the steering angle ratio to a desired value irrespective of the vehicle speed in a front and rear wheel steering device for vehicle which can vary the steering angle ratio of the rear wheels relative to the front wheels, and, further, an inadvertent sudden change in the motion of the vehicle is prevented when such a manual selection is not desirable or when the acceleration of the vehicle is unsuitable for manual selection of steering angle ratio, by prohibiting the manual selection.

In this embodiment, the vehicle speed change rate data (g) for performing such a restriction is selected from a vehicle speed change rate range which would not cause any sudden change in the vehicle motion. Generally speaking, the vehicle speed change rate data may be selected so as to be compared with the absolute value of the actual vehicle speed change rate, but it is also possible to use different values of the vehicle speed change rate for the times of acceleration and deceleration so that different limits may be given for acceleration and deceleration of the vehicle.

Further, it is also possible to add an appropriate delay means to the manual selector so that the manual selection may be gradually accomplished even when the action of the manual selector is not restricted, and the steering angle of the rear wheels may not undergo sudden changes irrespective of the steering angle of the front wheels at all times.

Figure 7:
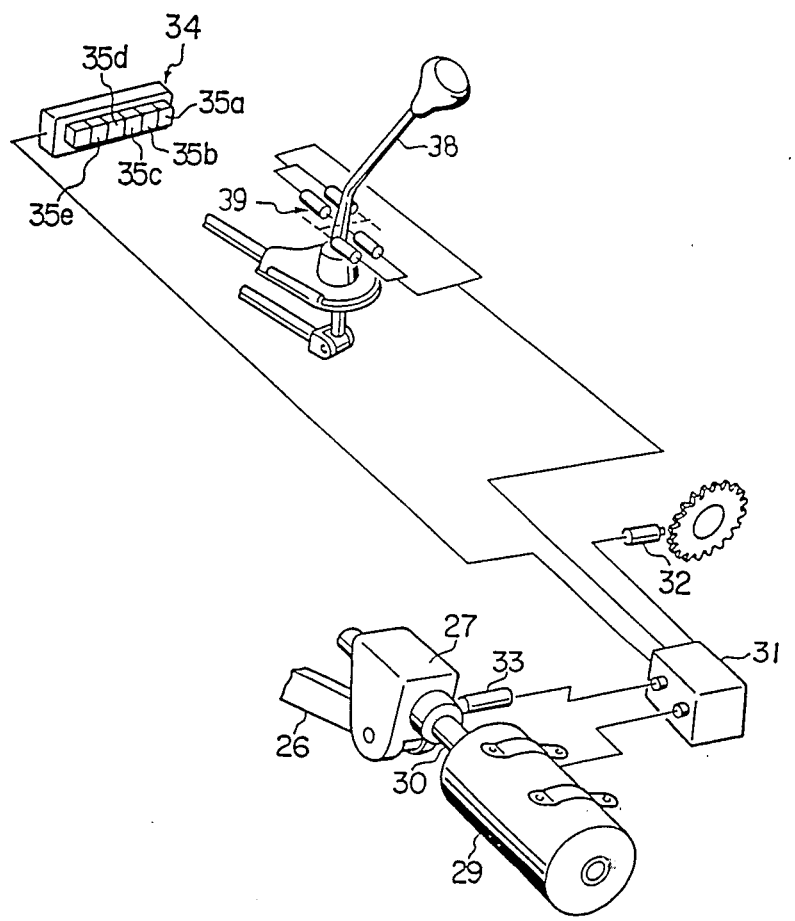
FIG. 7 is a perspective view, similar to FIG. 4, of another embodiment of the control structure for a rear wheel steering system.
Figure 8:
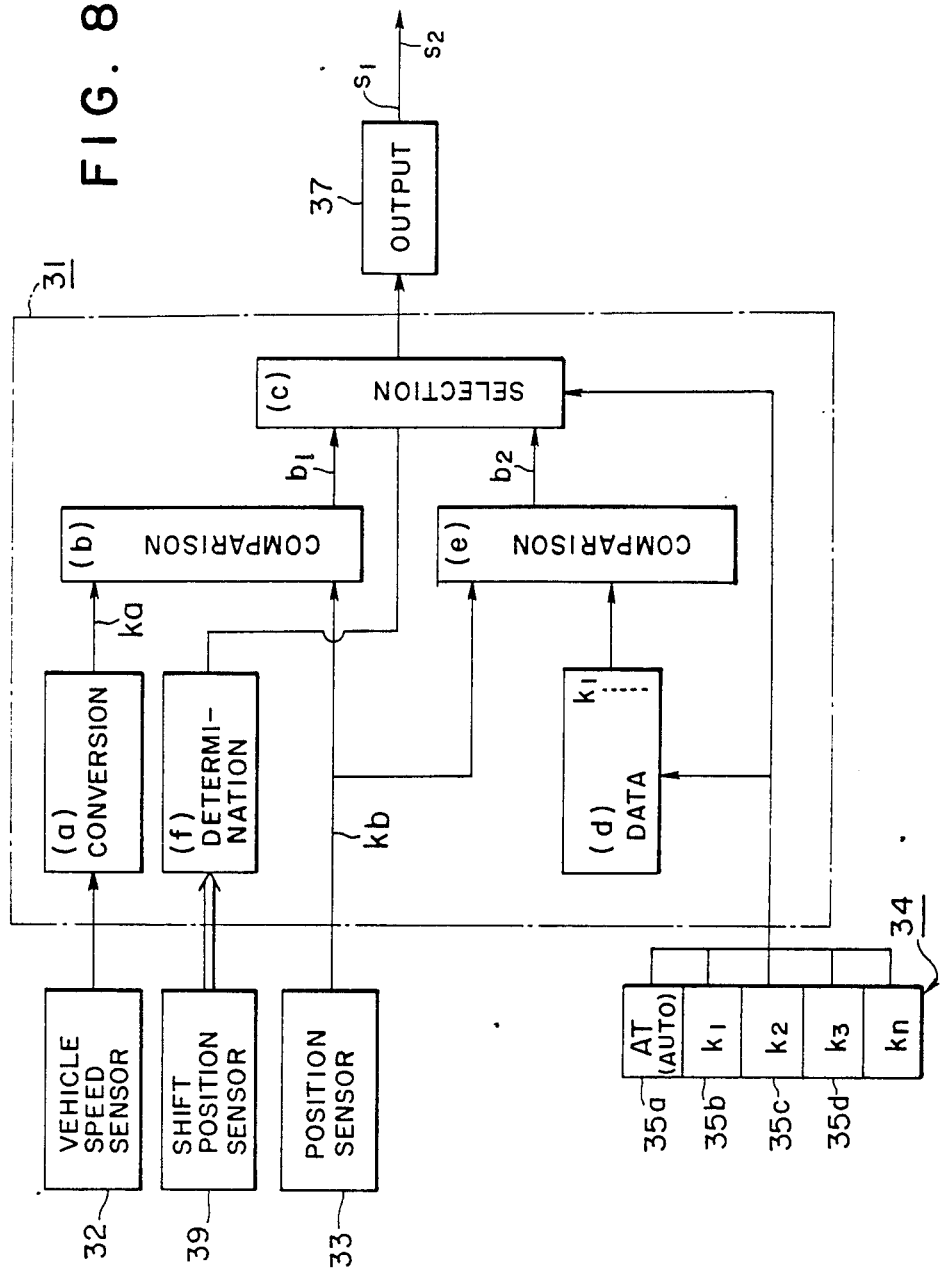
FIG. 8 is a functional block diagram of the embodiment of FIG. 7.

FIGS. 7 and 8 shows another embodiment of the present invention. In these drawings, the parts corresponding to those in the previously described embodiment are denoted by like numerals and their detailed description is omitted to avoid unnecessary repetition of the disclosure.

According to this embodiment, a shift position sensor 39 is provided in the vicinity of a lower portion of a transmission shift lever 38 for detecting the position of the shift lever 38. In the case of the illustrated embodiment, the shift position sensor 39 comprises limit switches which are provided in the shift positions other than "low" and "reverse" positions. However, the structure of the sensor is not limited to such and it is also possible to provided such limit switches at all the shift positions or at the positions other than "low", "reverse" and "neutral", and the switches are not limited to mechanical limit switches but may also be photo sensors and others. If the transmission is an automatic transmission system, it is possible to provide such a sensor inside the automatic transmission system to detect the shift positions of the transmission gears.

According to this embodiment, the automatic action (AT) of the front and rear wheel steering device is identical to that of the previous embodiment, but, as shown in FIG. 8, a determination process (f) receives the shift position signal from the shift position sensor 39 and acts upon the selection process (c) in such a manner as to prohibit the manual selection if the shift position is other than "low" and "reverse" positions.

Thus, when the shift position is in any one of high speed positions or, in other words, the vehicle speed may well be high, the manual selection is prohibited. Therefore, in view of the fact that in low speed range normally the opposite phase relationship is desirable to reduce the turning radius of the vehicle but, since the rear of the vehicle tends to move sideways as seen from the driver according to the opposite phase relationship, and yet the same phase relationship is more desirable when the vehicle is to start off from a position in which the vehicle is parked along a wall or a curb stone in close proximity, this embodiment provides the advantage of greater maneuverability under all circumstances in low speed range allowing manual selection of either of the two different phase relationships, preventing, but at the same time, inadvertent selection of the manual mode in high speed range which could cause unexpected handling of the vehicle.

Figure 9:
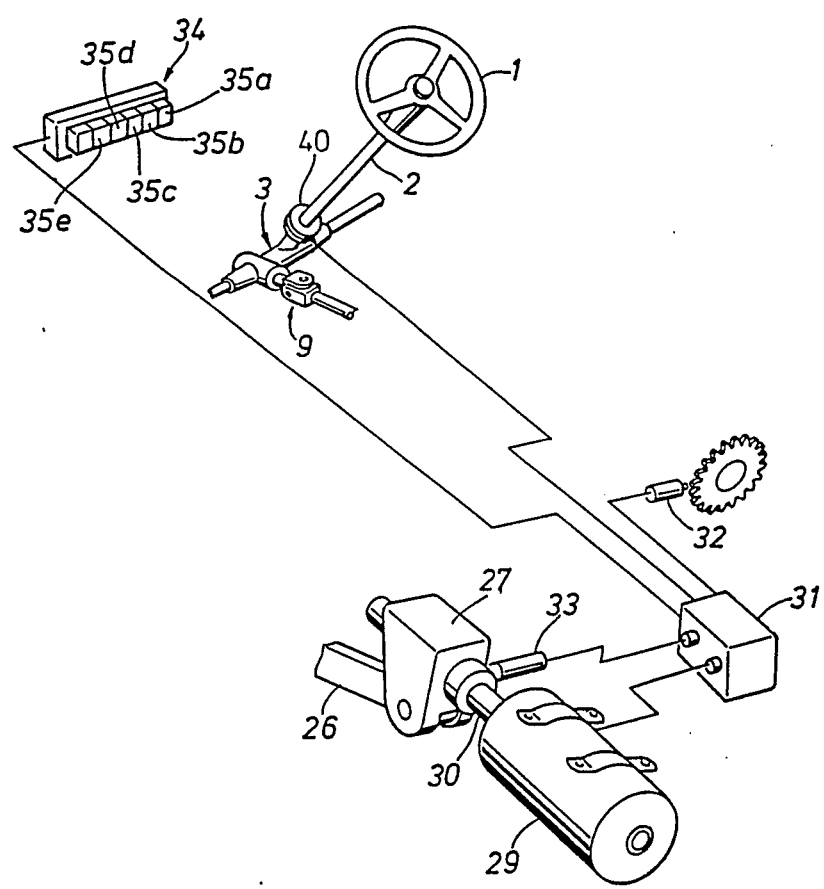
FIG. 9 is a perspective view, similar to FIG. 4, of yet another embodiment of the control structure for a rear wheel steering system.
Figure 10:
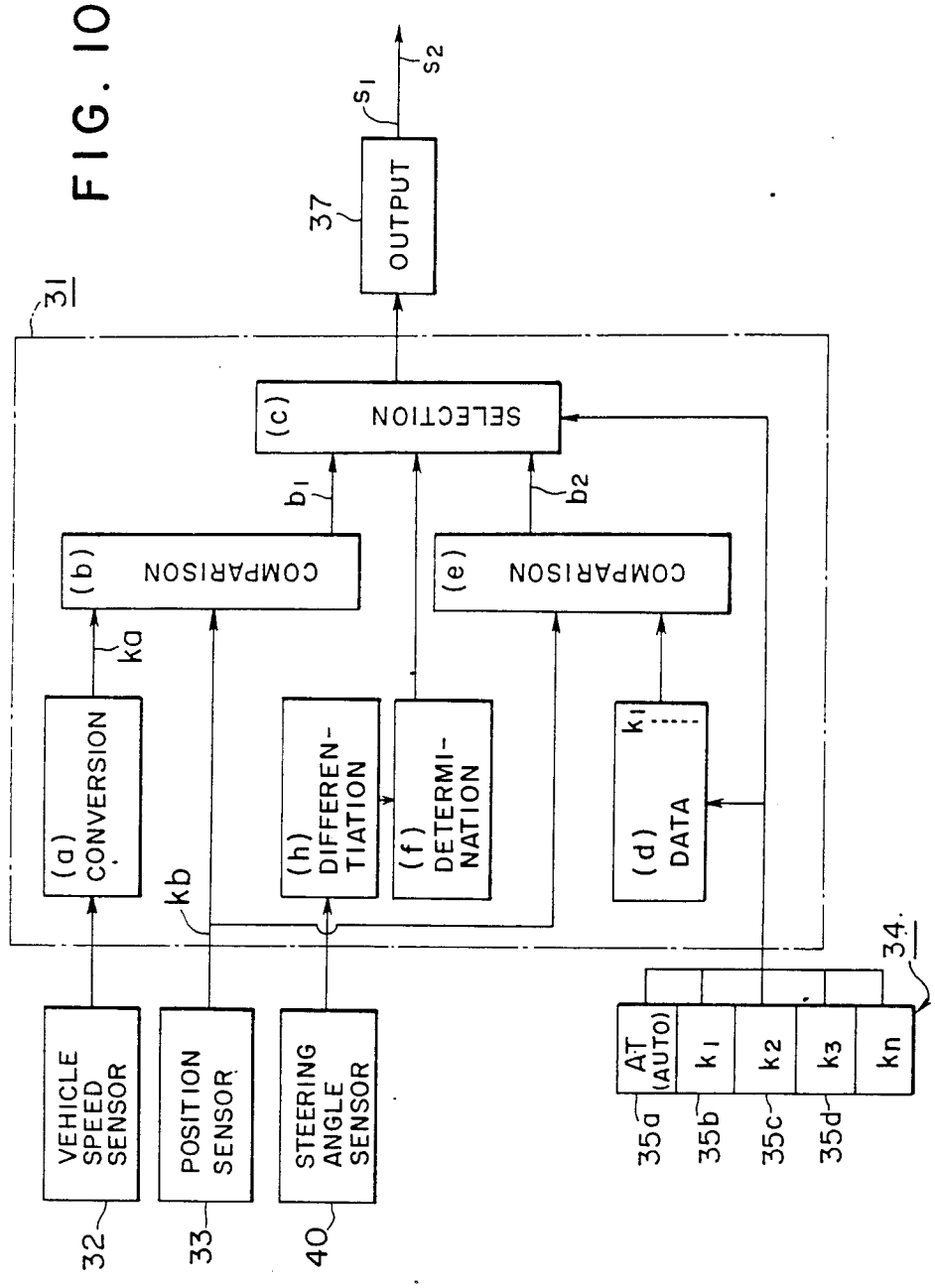
FIG. 10 is a functional block diagram of the embodiment of FIG. 9.

FIGS. 9 and 10 show yet another embodiment of the present invention. In these drawings, the parts corresponding to those in the previously described embodiments, in particular the one described in conjunction with FIGS. 4 and 5, are denoted by like numerals and their detailed description is omitted to avoid unnecessary repetition of the disclosure.

According to this embodiment, a steering angle sensor 40 for measuring the steering angle of the front wheels is placed in a lower portion of the steering column shaft 2. This sensor may be a potentiometer type sensor, an electromagnetic sensor or a sensor of any other type which can, either directly or by differentiation, produce a signal representing the rotational speed of the steering shaft 2 or the steering speed of the front wheels. The output of this steering angle sensor 40 is also connected to the computer 31.

According to this embodiment, although the automatic action (AT) thereof is no different from the previously described embodiments, the computer 31 differentiates, in a differentiation process (h), the steering angle signal from the steering angle sensor 40 and obtains a steering speed signal for use in a determination process (f). In the determination process (f), the steering speed signal is compared with a predetermined reference steering speed data and it is determined whether the former is greater than the latter or not. When the actual steering speed is greater than the predetermined steering speed data, the determination result is given to the selection process (c) and the output of the correction information $b_2$ for manual correction is restricted. In other words, in the state of correcting the steering angle ratio by the automatic action AT, as long as the actual steering speed is greater than the predetermined steering speed data, the selection process (c) maintains the automatic action AT and will not allow the manual selection of steering angle ratio even when the manual correction is selected on the manual selector 34.

The steering speed data for performing such a restriction is selected from a steering speed range which would not cause any sudden change in the vehicle motion. Generally speaking, the steering angle data may be selected so as to be compared with the absolute value of the actual steering speed, but it is also possible to perform the determination process by comparing a combination of the steering angle and the steering speed.

This embodiment can provide the advantage of preventing inadvertent manual selection of improper steering angle ratio when the vehicle is turning or when such a manual selection may cause unfavorable response of the vehicle. Specifically, according to this embodiment, manual selection of a steering angle ratio is possible only when the vehicle is running straight or in a motion which is close to a steady turn.

Figure 11:
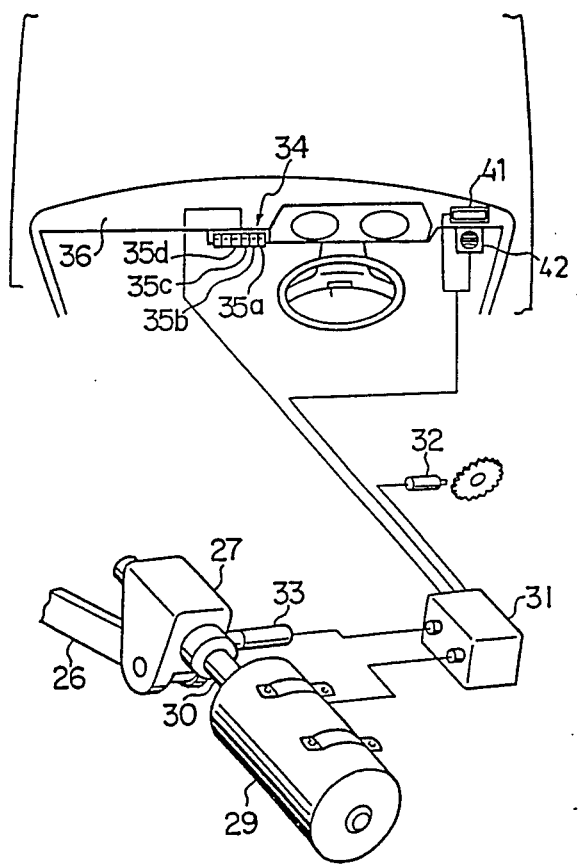
FIG. 11 is a perspective view, similar to FIG. 4, of a fourth embodiment of the control structure for a rear wheel steering system.
Figure 12:
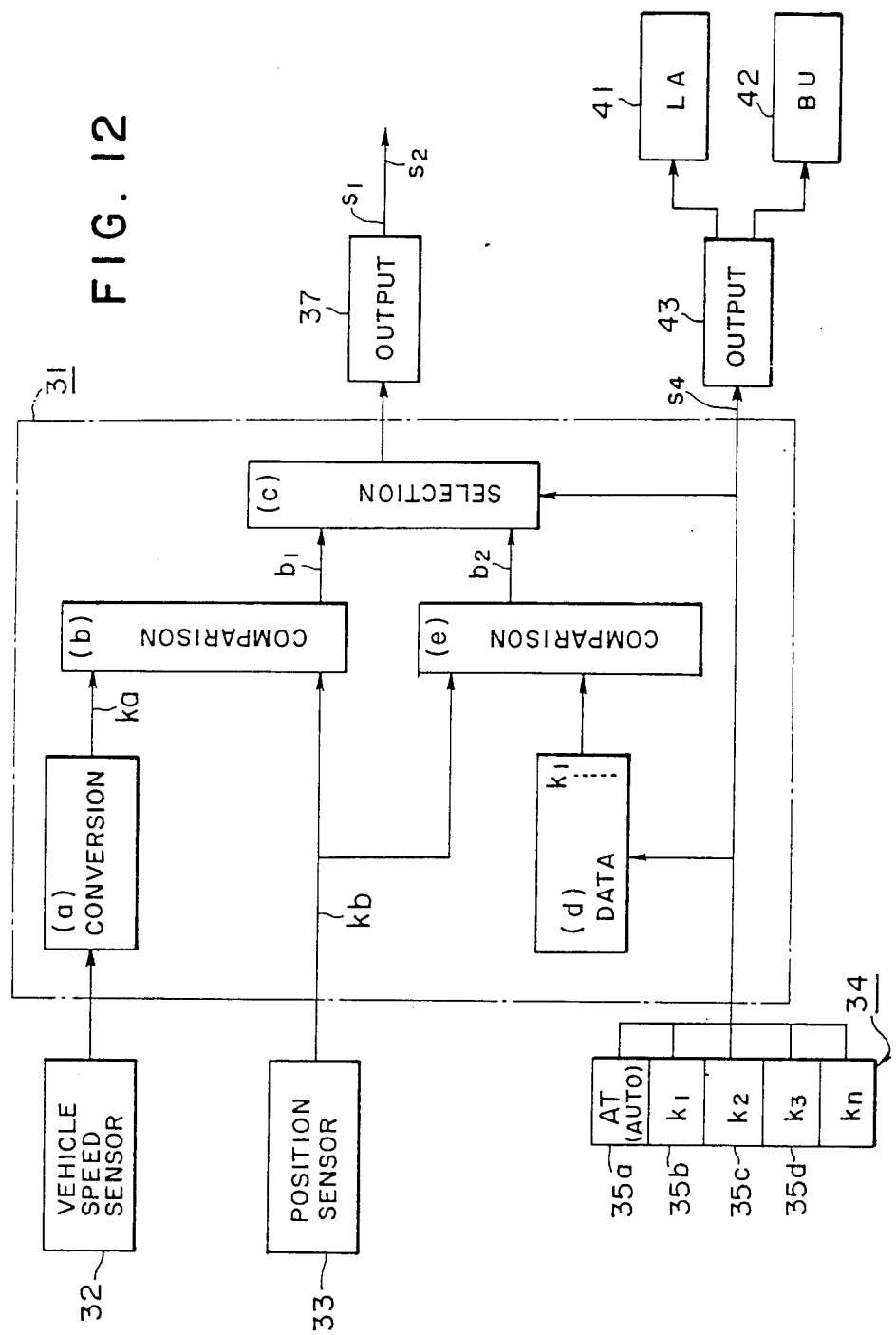
FIG. 12 is a functional block diagram of the embodiment of FIG. 11.

FIGS. 11 and 12 show a fourth embodiment of the present invention. In these drawings, the parts corresponding to those in the previously described embodiments, in particular the one described in conjunction with FIGS. 4 and 5, are denoted by like numerals and their detailed description is omitted to avoid unnecessary repetition of the disclosure.

According to this embodiment, an alarm lamp 41 and an alarm buzzer 42 are provided at appropriate places in the instrument panel 36 of the vehicle and are connected to the manual selector 34 by way of an output device 37. Instead of using both the alarm buzzer and the alarm lamp, it is possible to use only either one of them.

As shown in FIG. 12, the manual selector 34 is connected to the output device 43 for the alarm lamp 41 and the alarm buzzer 42 and activates the alarm lamp 41 and the alarm buzzer 42 when the steering angle ratio is manually selected.

Thus, by warning the driver whenever the steering angle ratio is manually selected, the driver will not encounter an unexpected response of the vehicle even when he has forgotten that the manual selection is still in effect.

As a modified embodiment, it is possible to incorporate a timer, for instance in the output device 43, so that the alarm is issued only when the manual selection is made and a certain time interval has elapsed thereafter. This embodiment can provide the advantage that, after the driver has manually selected a certain steering angle ratio which is suitable for parking the vehicle along a wall in close proximity (the same phase relationship) or for running in narrow and crooked alleys where a small turning radius is required (the opposite phase relationship), he will not forget to turn off the manual selection, owing to the warning from the lamp 41 and/or the buzzer 42, when he proceeds to high speed roads.

As another modified embodiment, it is possible to combine the second embodiment and the fourth embodiment. Namely, according to this modified embodiment, the warning lamp 41 and/or the warning buzzer 42 is activated only when the manual selection of the steering angle ratio is made and, at the same time, the shift lever 38 is in a high speed position. Thus, a driver who has manually selected a certain fixed steering angle ratio which is suitable for maneuvering the vehicle in a restricted space has shifted up the transmission gear, ready for high speed cruising, he will be warned either to release the manual selection of the steering angle ratio or to reduce the vehicle speed. Thus, the vehicle can be highly manueverable in low speed range since the vehicle may have a very small turning radius when the rear wheels are in the opposite phase although the rear wheels will cause the rear of the vehicle to swing out on the turn or the rear part of the vehicle can move sideways in the same direction as the front part of the vehicle when the rear wheels are in the same phase, depending on the manually selected steering angle ratio, and, yet, since the warning system prevents the manual selection of the steering angle ratio in high speed range, the vehicle will not display any undue response in high speed range.

Figure 13:
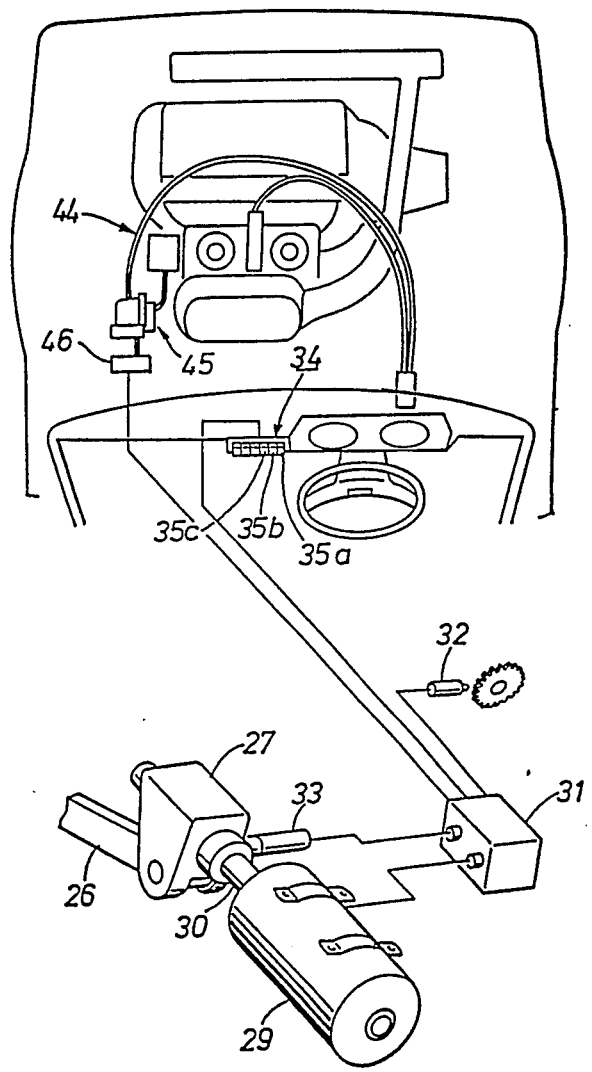
FIG. 13 is a perspective view, similar to FIG. 4, of a fifth embodiment of the control structure for a rear wheel steering system.
Figure 14:
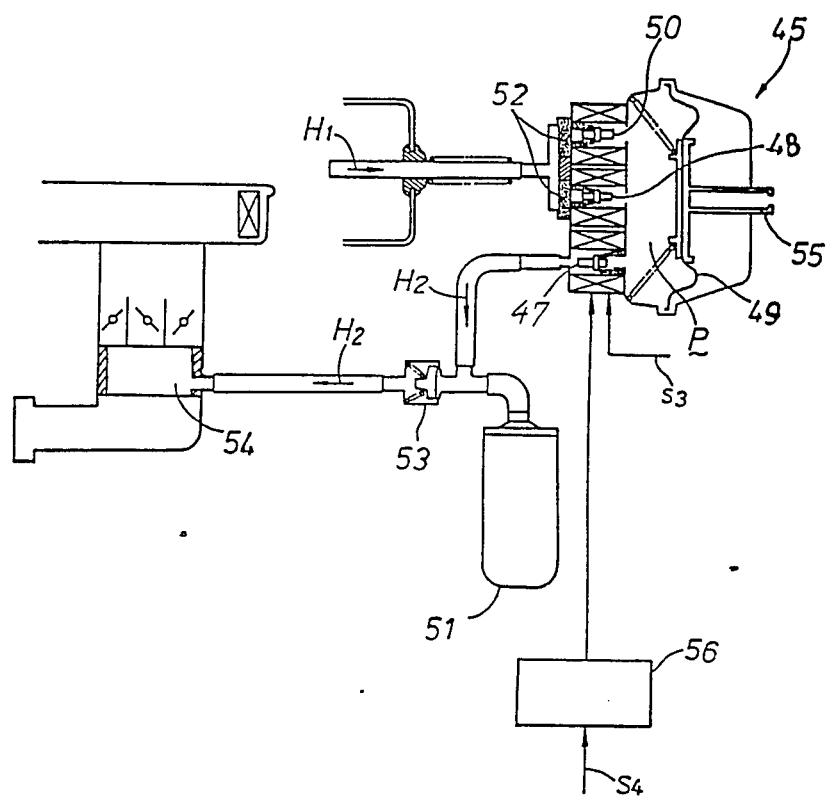
FIG. 14 is a schematic sectional view of the cruise control system of FIG. 13.

FIGS. 13 to 15 show a fifth embodiment of the present invention. In these drawings, the parts corresponding to those in the previously described embodiments, in particular the one described in conjunction with FIGS. 4 and 5, are denoted by like numerals and their detailed description is omitted to avoid unnecessary repetition of the disclosure.

In FIGS. 13 and 14, numeral 44 denotes an automatic cruise control device which is a device for keeping vehicle speed fixed on a freeway and so on without stepping on an accelerator pedal. As best shown in FIG. 14, the automatic cruise control device 44 comprises a throttle actuator 45 which controls throttle opening by opening and closing a vacuum valve 47 for acceleration and a vent valve 48 for deceleration to introduce engine vacuum or atmosphere, as the case may be, into a vacuum chamber P of the actuator 45 and to activate a diaphragm 49 for driving a accelerator pedal link according to a signal $S_3$ supplied from an output device 56 which is in turn controlled by a known cruise control unit not shown in the drawings. The vacuum valve 47 introduces negative pressure in the vacuum chamber P when energized and shuts off negative pressure when deenergized. The vent valve 48 shuts off atmosphere to maintain the negative pressure in the negative pressure chamber P when energized and introduces autospheric pressure into the negative pressure chamber P when deenergized. A safety valve denoted by numeral 50 shuts off atmosphere when energized and introduces atmosphere when deenergized to speed up the canceling of the cruise control. Numerals 51, 52, 53, 54 and 55 denote a vacuum accumulator, a filter, a check valve, a carburetor insulator and a pedal link connection, respectively.

In this embodiment, as best shown in FIGS. 14 and 15, the output control device 56 is connected to the actuator 45, in particular to the vacuum valve 47 and the vent valve 48 thereof, to drive these valves 47 and 48, and the manual selector 34 is connected to the output control device 56 to supply a necessary control signal $S_4$ thereto. Thus, the manual selector 34 can act upon the actuator 45 to control the throttle opening or the vehicle speed within a limit when the steering angle ratio is manually selected.

The actions of the automatic action and the manual selection described in connection with FIG. 5 also apply to the embodiment of FIGS. 13 to 15 and the detailed description thereof is not repeated here.

Although the present invention was described in terms of concrete embodiments, those skilled in the art will recognize that modifications can be made to the embodiments disclosed without departing from the spirit and scope of the invention. For example, the various processes conducted in the computer 31 may be executed by a certain program (software) stored for instance in a storage area of the computer 31. Alternatively, it is possible to utilize electric circuitry and/or mechanical structures instead of a computer to achieve the same functions.

Further, the steering angle ratio of the front and the rear wheels were manually controlled according to the output of the position sensor 33 and the manual selector, but the steering angle of the rear wheels may be directly determined instead of being determined by way of the steering angle ratio.

Further, application of this invention is not limited to a vehicle with a manual steering system but the present invention may also be applied to vehicles equipped with various forms of power assisted steering systems such as hydraulic power steering systems, electric power steering system, vacuum assisted power steering systems and so on. And, the transmission of the steering force from the front steering system to the rear steering system may also be embodied in many different ways, for instance by transmission of hydraulic pressure. If the steering of the rear wheels are electrically controlled, the output of the steering angle sensor may be directly processed by a computer which in turns drives an actuator for steering the rear wheels.

Thus according to this invention, the maneuverability of a vehicle can be improved by allowing the manual change of the steering angle ratio to a desired value irrespective of the a vehicle speed in a front and rear wheel steering device for vehicle which can vary the steering angle ratio of the rear wheels relative to the front wheels. The present invention has an additional advantage of preventing any unexpected sudden change in the driving response of the vehicle by issuing a warning or limiting the manual selection of steering angle ratio or limiting the speed of the vehicle.

We claim:

1. A front and rear wheel steering device control for a vehicle for variably controlling the steering angle rtio of rear wheels relative to front wheels according to certain conditions, comprising:
   storage means for storing data of at least one fixed rear wheel steering ratio and a variable rear wheel steering angle ratio whch is a function of vehicle speed;
   actuator means for achieving a rear wheel steering angle ratio selected from the data stored in the storage means;
   manual switching means which selects the fixed rear wheel steering angle ratio when activated and selects the variable rear wheel steering angle ratio when deactivated; and
   a limiting means for deactivating the action of the manual switching means when the change rate of vehcle speed is greater than a certain value.

2. A front and rear wheel steering device control as defined in claim 1, wherein the limiting means limits the action of the manual switching means when the absolute value of the change rate of the vehicle speed is greater than a certain value.

3. A front and rear wheel steering device control as defined in claim 1, wherein the limiting means limits the action of the manual switching mean when the change rate of the vehicle speed is greater than a certain positive value or less than a certain negative value.

4. A front and rear wheel steering device control as defined in any one of claims 1, 2 or 3, wherein the manual switching means comprises a delay means which allows the manual selection to be made gradually with some time delay.

5. A front and rear wheel steering device control as defined in claim 1, wherein the limiting means limits the action of the manual switching means when the change rate of front wheel steering is greater than a certain value.

6. A front and rear wheel steering device control as defined in claim 1, wherein the limiting means limits the action of the manual switching means when a transmission of the vehicle is in high speed shift position.

7. A front and rear wheel steering device control for a vehicle for variably controlling the steering angle ratio of rear wheels relative to front wheels according to certain conditions, comprising:
   storage means for storing data of at least one fixed rear wheel steering ratio and a variable rear wheel steering angle ratio which is a function of vehicle speed;
   actuator means for achieving a rear wheel steering angle ratio selected from the data stored in the storage means;
   manual switching means which selects the fixed rear wheel steering angle ratio when activated and selects the variable rear wheel steering angle ratio when deactivated; and
   a warning means for issuing a warning when the manual switching means is activated.

8. A front and rear wheel steering device control as defined in claim 1, wherein the warning means is adapted to issue a warning when the manual switching means is activated and a transmission of the vehicle is in a high speed shift position.

9. A front and rear wheel steering device control as defined in claim 7 or 8, wherein the warning means comprises a delay means so as to issue a warning after a certain time delay.

10. A front and rear wheel steering device control for a vehicle for variably controlling the steering angle ratio of rear wheels relative to front wheels according to certain conditions, comprising:
    storage means for storing data of at least one fixed rear wheel steering ratio and a variable rear wheel steering angle ratio which is a function of vehicle speed;
    actuator means for achieving a rear wheel steering angle ratio selected from the data stored in the storage means;
    manual switching means which selects the fixed rear wheel steering angle ratio when activated and selects the variable rear wheel steering angle ratio when deactivated; and
    a vehicle speed limiting means for limiting the vehicle speed when the manual switching means is activated.

11. A front and rear wheel steering device as defined in claim 10, further comprising an alarm means which is adapted to issue a warning when the vehicle speed limiting means is activated.

12. A front and rear wheel steering device for vehicle as defined in claim 10 or 11, wherein the vehicle speed limiting means is adapted to control a throttle control actuator.

13. A front and rear wheel steering device control for a vehicle for variably controlling the steering angle ratio of rear wheels relative to front wheels according to certain conditions, comprising:
    storage means for storing data of at least one fixed rear wheel steering ratio and a variable rear wheel steering angle ratio which is a function of vehicle speed;
    actuator means for achieving a rear wheel steering angle ratio selected from the data stored in the storage means;
    manual switching means which selects the fixed rear wheel steering angle ratio when activated and selects the variable rear wheel steering angle ratio when deactivated; and
    a limiting means for deactivating the action of the manual switching means when the change rate of front wheel steering is greater than a certain value.

* * * * *